US010803276B2

(12) United States Patent
Kwon et al.

(10) Patent No.: US 10,803,276 B2
(45) Date of Patent: Oct. 13, 2020

(54) ELECTRONIC DEVICE INCLUDING BIOMETRIC SENSOR

(71) Applicant: SAMSUNG ELECTRONICS CO., LTD., Suwon-si, Gyeonggi-do (KR)

(72) Inventors: Oh-Hyuck Kwon, Yongin-si (KR); Hyung-Dal Kim, Yongin-si (KR); Beom-Ju Kim, Suwon-si (KR); Eun-Hwa Lee, Suwon-si (KR); Jae-Young Kim, Ansan-si (KR); Jong-Il Kim, Anyang-si (KR); Min-Su Jung, Seoul (KR); Ji-Woong Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 222 days.

(21) Appl. No.: 15/719,930

(22) Filed: Sep. 29, 2017

(65) Prior Publication Data

US 2018/0096187 A1 Apr. 5, 2018

(30) Foreign Application Priority Data

Oct. 5, 2016 (KR) .................. 10-2016-0128450

(51) Int. Cl.
*G06K 9/00* (2006.01)
*G06F 3/041* (2006.01)
(Continued)

(52) U.S. Cl.
CPC ....... *G06K 9/00013* (2013.01); *G06F 1/1613* (2013.01); *G06F 3/041* (2013.01);
(Continued)

(58) Field of Classification Search
CPC ... G06F 1/1613; G06F 21/32; G06K 9/00046; G06K 9/00013; G06K 9/0004
See application file for complete search history.

(56) References Cited

U.S. PATENT DOCUMENTS

| 10,303,921 | B1* | 5/2019 | He ........................ G06K 9/0004 |
| 2010/0172552 | A1* | 7/2010 | Wu ...................... G06K 9/00013 |
| | | | 382/124 |

(Continued)

FOREIGN PATENT DOCUMENTS

| KR | 10-2016-0059342 | 5/2016 |
| WO | 2015/192630 | 2/2015 |

OTHER PUBLICATIONS

Extended Search Report dated Feb. 19, 2018 in counterpart European Patent Application No. 17194556.1.

*Primary Examiner* — Utpal D Shah
(74) *Attorney, Agent, or Firm* — Nixon & Vanderhye P.C.

(57) ABSTRACT

According to an embodiment of the present disclosure, an electronic device may comprise a housing including a first surface facing in a first direction and a second surface facing in a second direction opposite the first direction, the housing including a transparent cover that comprises at least part of the first surface, a display disposed between the first surface and the second surface of the housing and configured to display information through the transparent cover to an outside, an illumination part comprising light emitting circuitry disposed at an inner side of an end of the first surface of the housing and configured to emit light to the transparent cover, an optical coupler disposed between the illumination part and the transparent cover and configured to reflect light from the illumination part to the transparent cover, and a biometric sensor disposed under the transparent cover and the display. In an electronic device including a biometric sensor according to an embodiment of the present disclosure, a light source is put to use in sensing the user's fingerprint information using a biometric sensor positioned in a display activation area, thereby providing better performance and an improved outer appearance.

18 Claims, 10 Drawing Sheets

(51) Int. Cl.
  *G06F 1/16* (2006.01)
  *G06F 21/32* (2013.01)
  *H04M 1/02* (2006.01)
(52) U.S. Cl.
  CPC ............ *G06F 21/32* (2013.01); *H04M 1/026* (2013.01); *H04M 1/0266* (2013.01); *H04M 1/0277* (2013.01)

(56) References Cited

U.S. PATENT DOCUMENTS

| | | | |
|---|---|---|---|
| 2013/0021302 A1* | 1/2013 | Drumm | G06F 3/0421 345/175 |
| 2017/0124370 A1* | 5/2017 | He | G06K 9/0012 |
| 2017/0193270 A1 | 7/2017 | Zhang | |
| 2017/0270342 A1* | 9/2017 | He | G06F 3/044 |
| 2017/0316248 A1* | 11/2017 | He | G06K 9/00006 |
| 2018/0005005 A1* | 1/2018 | He | G06F 21/83 |

* cited by examiner

ELECTRONIC DEVICE INCLUDING BIOMETRIC SENSOR

CROSS-REFERENCE TO RELATED APPLICATION

This application is based on and claims priority under 35 U.S.C. § 119 to a Korean patent application filed in the Korean Intellectual Property Office on Oct. 5, 2016 and assigned Serial No. 10-2016-0128450, the disclosure of which is incorporated by reference herein in its entirety.

TECHNICAL FIELD

The present disclosure relates generally to electronic devices for efficiently reflecting light, which is emitted from a light source and is provided for a biometric sensor, to an upper transparent cover of a display.

DISCUSSION OF RELATED ART

Typically, displays are apparatuses for outputting images or image information. Most of electronic devices with information communication functionality come with a display. The development of electric or electronic technology led to much better performance and image quality for displays. A display may be integrated with a touch panel, allowing it to be used as an input device as well as an output device.

An electronic device with a display may produce horizontal elements (e.g., position or motion) of an input based on entry to a touch panel. Further, such electronic device may also recognize and identify a user using information acquired from part of the user's body. In particular, a person's unique features, such as his/her fingerprint, voice, face, hand, or iris, may be used to recognize and authenticate him or her.

Recent portable devices or other electronic devices may provide various additional functions using financial, security, or other personal information, in addition to communication functionality, such as call or text messaging service. Thus, there is a growing need for locking electronic devices. Vigorous development efforts are underway for electronic devices with a locking device that may lock the electronic device by recognizing the user's bio information to present better locking effects.

A conventional electronic device may produce the horizontal and vertical position of a touch to a surface of the electronic device based on various touch input schemes. The electronic device may come with a fingerprint recognition sensor capable of recognizing the user.

Conventional fingerprint recognition sensors have a hardware structure that is separate from the display and thus requires a separate space. The recent trend of mobile devices slimming down imposes limits on the position and space for a fingerprint recognition sensor. To sense bio information, e.g., recognize a fingerprint, the position of the sensor needs to be closer to the user, often resulting in an undesirable outer appearance of the electronic device.

SUMMARY

In an electronic device according to an example embodiment of the present disclosure, a biometric sensor is placed in a display activation area, addressing the issue of the limited space.

A light source is used in sensing the user's fingerprint information using a biometric sensor positioned in a display activation area, providing better performance.

According to an example embodiment of the present disclosure, an electronic device may comprise a housing including a first surface facing in a first direction and a second surface facing in a second direction opposite the first direction, the housing including a transparent cover that forms at least part of the first surface, a display disposed between the first surface and the second surface of the housing to display information through the transparent cover to an outside, an illumination part comprising light emitting circuitry disposed at an inner side of an end of the first surface of the housing configured to emit light to the transparent cover, a coupler disposed between the illumination part and the transparent cover configured to reflect the light from the illumination part to the transparent cover, and a biometric sensor disposed under the transparent cover and the display.

According to an example embodiment of the present disclosure, an electronic device may comprise a housing including a transparent cover exposed to an outside, a printed circuit part comprising a printed circuit board disposed inside the housing, a coupler disposed between the transparent cover and the printed circuit part configured to deliver light from an illumination part comprising light emitting circuitry electrically connected with the printed circuit part to the transparent cover, and a biometric sensor disposed between the transparent cover and the printed circuit part and electrically connected with at least part of the printed circuit part configured to sense the light delivered through the transparent cover.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements and wherein.

Throughout the drawings, like reference numerals will be understood to refer to like parts, components, and structures.

DETAILED DESCRIPTION

Figure 1:
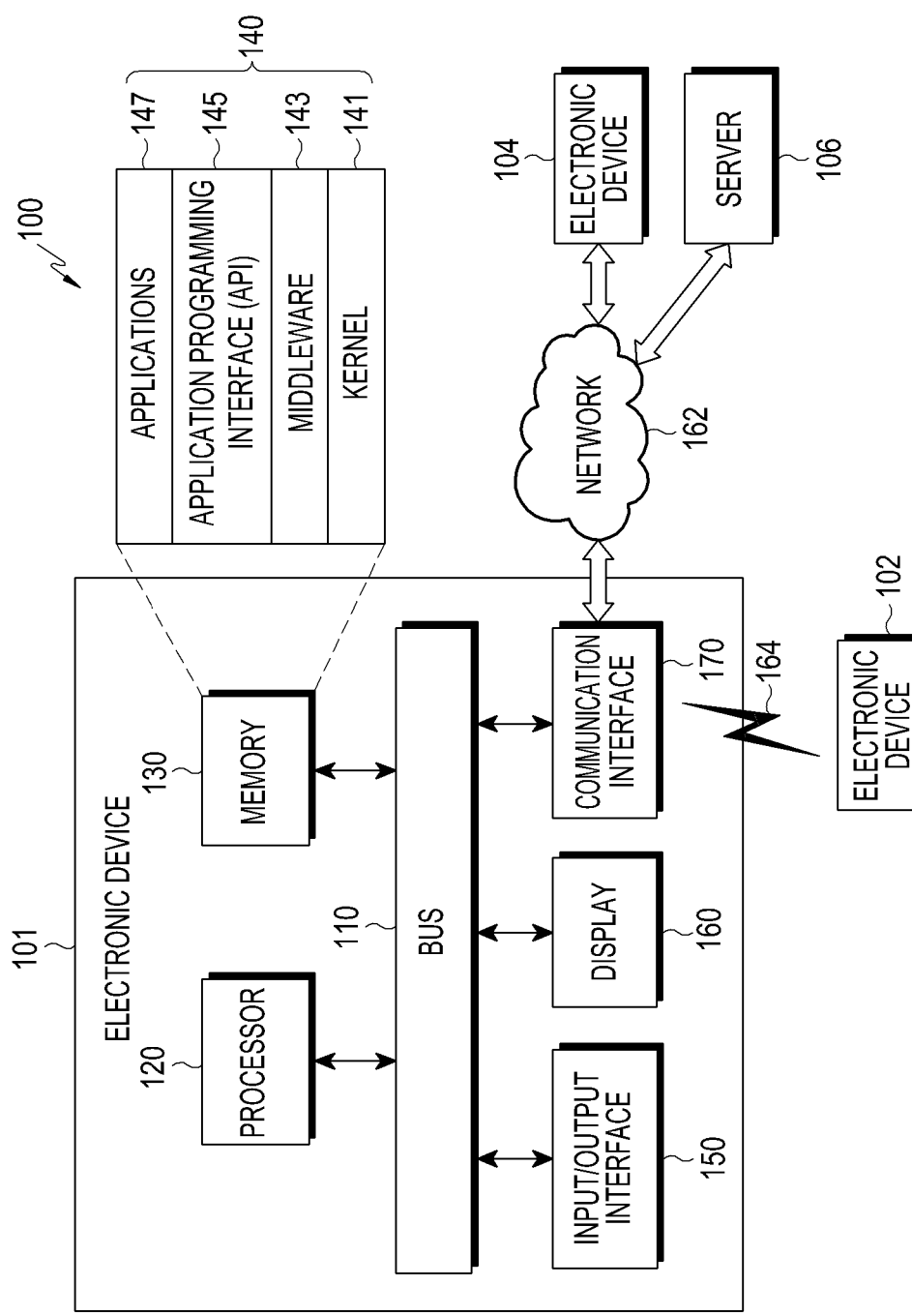
FIG. 1 is a diagram illustrating an electronic device in a network environment according to an example embodiment of the present disclosure.

Hereinafter, various example embodiments of the present disclosure are described with reference to the accompanying drawings. However, it should be appreciated that the present disclosure is not limited to the example embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may refer to a situation in which a device can perform an operation together with another device or parts. For example, the term "processor configured (or set) to perform A, B, and C" may refer, for example, and without limitation, to a generic-purpose processor (e.g., a CPU or application processor) that may perform the operations by executing one or more software programs stored in a memory device or a dedicated processor (e.g., an embedded processor) for performing the operations.

For example, examples of the electronic device according to various example embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device, or the like, but is not limited thereto. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device, or the like, but is not limited thereto. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame, or the like, but is not limited thereto.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler), or the like, but is not limited thereto. According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves), or the like, but is not limited thereto. According to embodiments of the present disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to an example embodiment of the present disclosure, an electronic device 101 is included in a network environment 100. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may exclude at least one of the components or may add another component.

The bus 110 may include a circuit for connecting the components 110 to 170 with one another and transferring communications (e.g., control messages or data) between the components.

The processor 120 may include various processing circuitry, such as, for example, and without limitation, one or more of a dedicated processor, a central processing unit (CPU), an application processor (AP), or a communication processor (CP). The processor 120 may perform control on at least one of the other components of the electronic device 101, and/or perform an operation or data processing relating to communication. The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control.

For example, the input/output interface 150 may include various input/output circuitry and transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may include various communication circuitry and set up communication between the electronic device 101 and an external electronic device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106). Additionally, the communication interface 170 may establish a wireless short-range communication connection 164 with, for example, an external electronic device (e.g., the first external electronic device 102).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2A:
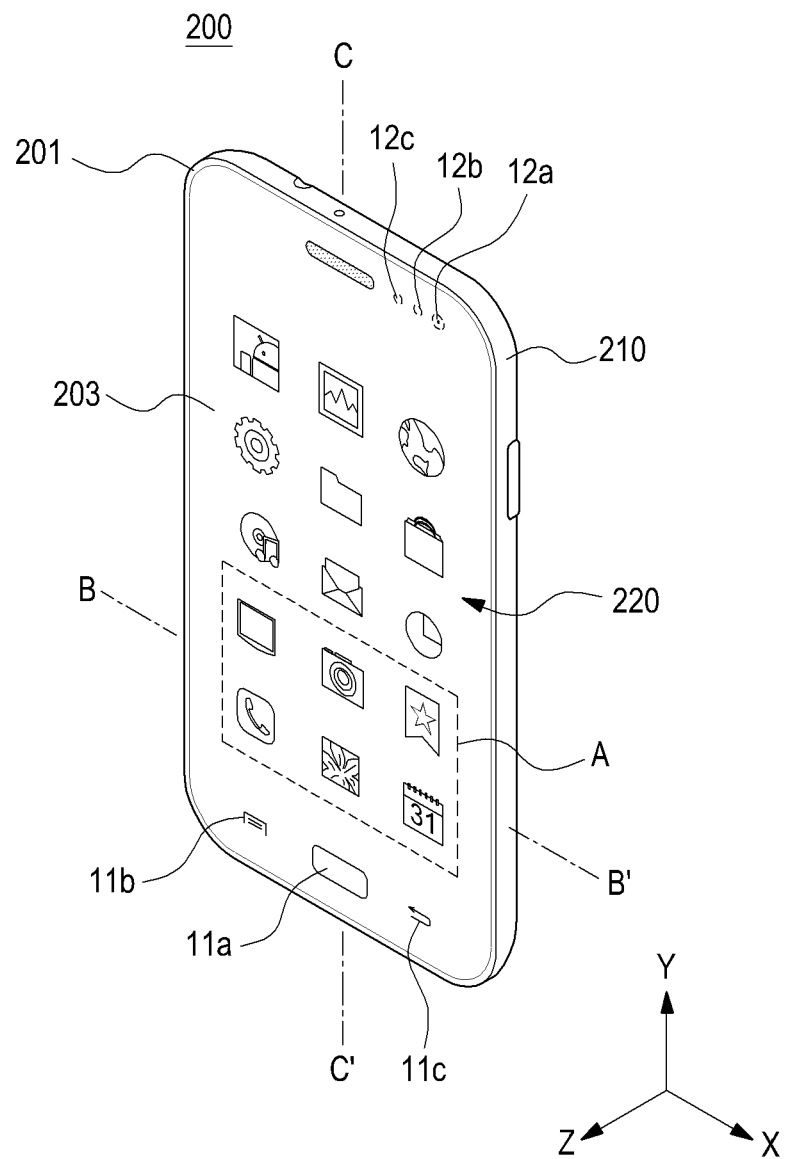
FIG. 2A is a perspective view illustrating an example electronic device according to an example embodiment of the present disclosure.
Figure 2B:
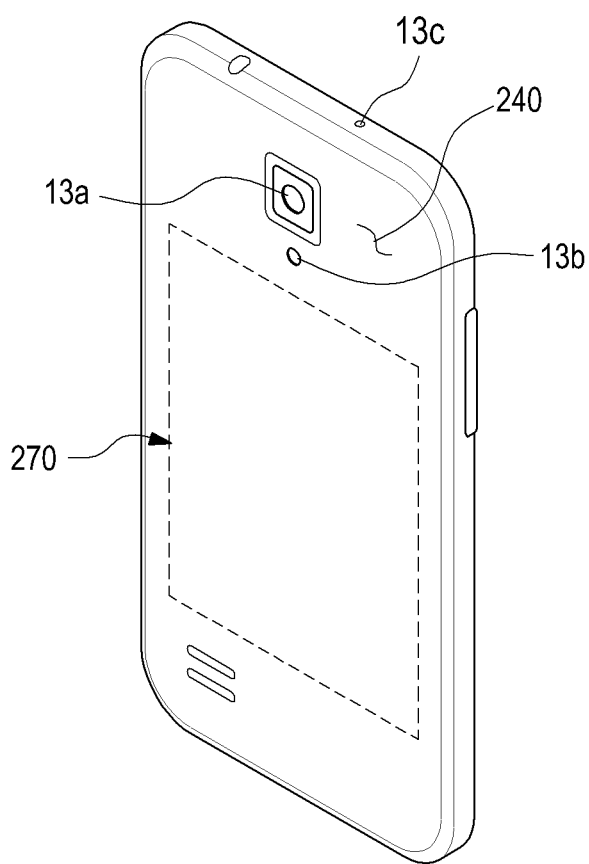
FIG. 2B is a perspective view illustrating an electronic device as viewed in a different direction than that shown in FIG. 2A according to an example embodiment of the present disclosure.

FIG. 2A is a perspective view illustrating an example electronic device 200 according to an example embodiment of the present disclosure. FIG. 2B is a perspective view illustrating an example electronic device 200 viewed in a different direction than shown in FIG. 2A according to an example embodiment of the present disclosure.

In the rectangular coordinate system as shown in FIG. 2A, 'X,' 'Y,' and 'Z,' respectively, may denote the width direction of the electronic device 200, the width direction, length direction, and the thickness direction of the electronic device 200.

Referring to FIGS. 2A and 2B, the electronic device 200 may include a housing 210 and a display 220. The housing 210 may include a first surface 201 facing in a first direction (+Z) and a second surface 240 facing in a second direction (−Z) which is an opposite direction of the first direction. The first surface 201 of the housing 201 may be a front surface of the electronic device, and the second surface 240 may be a rear cover of the electronic device. The housing 201 may have a front opening. A transparent cover 203 may be provided to form at least part of the front surface 201 of the housing 210, closing the front opening of the front surface 210' of the housing 210. The electronic device 200 may have a keypad in a side area of the transparent cover 203 on the housing 210. The keypad may include buttons or touch keys 11a, 11b, and 11c. The touch keys may generate input signals as they are touched by the user's body. According to an embodiment of the present disclosure, the keypad may be implemented to include only mechanical buttons or only the touch keys.

According to an embodiment of the present disclosure, the housing 210 may be an element for receiving various electronic parts. At least part of the housing 210 may be formed of a conductive material. For example, the housing 210 may have side walls that form outer side surfaces of the electronic device 200. Portions of the housing 210, which are exposed to the outside of the electronic device 200, may be formed of a metal. A printed circuit part (not shown) and/or a battery 270 may be received inside the housing 210. For example, a processor, a communication module, various interfaces (e.g., the interfaces 150 and 170 of FIG. 1), or a power management module may be mounted on the printed circuit part (not shown) in the form of an integrated circuit (IC) chip. For example, a control circuit may also be configured in an IC chip and mounted on the printed circuit part. For example, the control circuit may be part of the processor or the communication module. The housing 210 embeds the battery 270 to secure power.

According to an embodiment of the present disclosure, a first camera 12a, an illumination sensor 12b, or a proximity sensor 12c may provide in an upper area of the front surface of the electronic device 200. For example, a second camera 13a, a flash 13b or a speaker 13c may be provided in the rear surface of the electronic device 200.

According to an embodiment of the present disclosure, the display 220 may be exposed through the front surface of the housing 210. The display 220 may be, at least partly, formed of a material that transmits radio waves or magnetic fields. The display 220 may be mounted on the front surface of the housing 210. The display 220 may include a display panel that is mounted under the transparent cover 203 formed of, for example, and without limitation, reinforced glass. A touch panel may be provided between the transparent cover 203 and the display panel. For example, the display 220 may be utilized as an input device equipped with touchscreen functionality, not alone as an output device for outputting screen.

According to an embodiment of the present disclosure, the rear surface of the electronic device 200 may include a rear cover 240 to protect the rear surface of the housing 210. The rear cover 240 is mounted to face the display 220, e.g., in the second direction. The rear cover 240 may be formed of a material capable of transmitting radio waves or magnetic fields, e.g., reinforced glass or synthetic resin. The rear cover 240, along with the housing 210 and the display 220, may configure an outer appearance of the electronic device 200.

According to an embodiment of the present disclosure, the electronic device 200 may have a fingerprint sensing area (not shown) for recognizing a fingerprint in at least part of an active area A (which is an area where actual display pixels are formed to display information) of the display. As the fingerprint sensing area (not shown) is formed in the active area A, a majority of the front surface of the electronic device 200 may be used as a display.

Hereinafter, a fingerprint sensor for sensing fingerprint information about a user through an active area A and a structure for delivering light to the fingerprint sensor are described in greater detail below.

Figure 3:
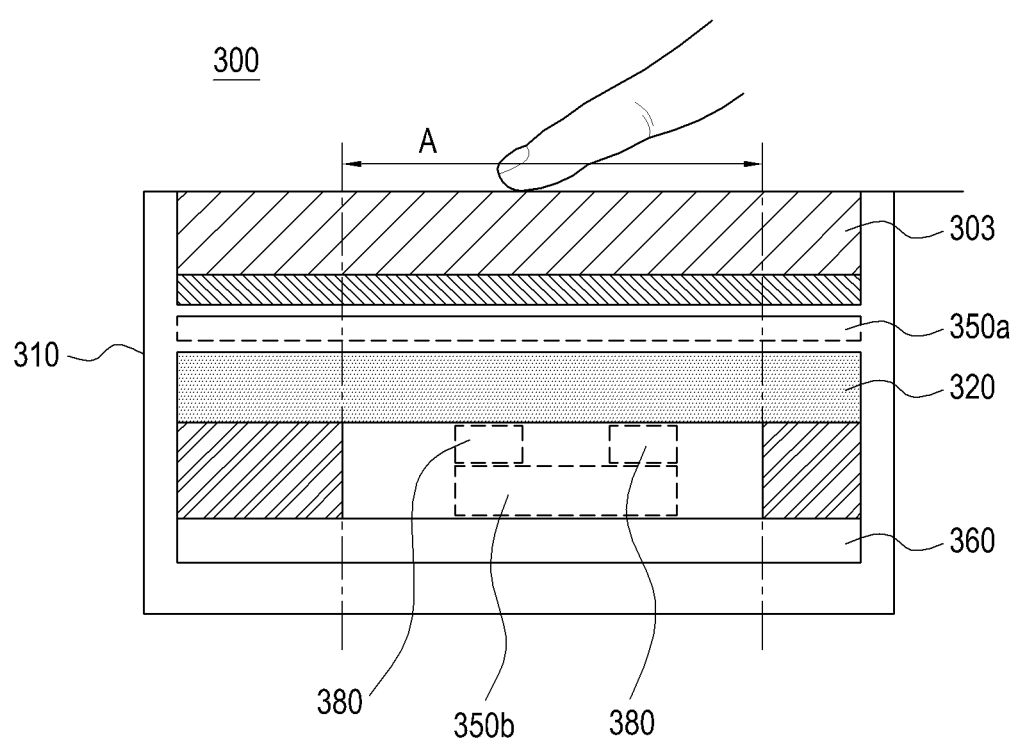
FIG. 3 is a cross-sectional view taken along line B-B' of FIG. 2A, according to an example embodiment of the present disclosure.

FIG. 3 is a cross-sectional view taken along line B-B' of FIG. 2A, according to an example embodiment of the present disclosure. Referring to FIG. 3, a housing 310, a transparent cover 303, and a display 320 of an electronic device 300 may correspond, for example, and without limitation, to the housing 210, the transparent cover 203, and the display 220, respectively, of FIGS. 2A and 2B.

Referring to FIG. 3, the electronic device 300 may include a biometric sensor for sensing a user's bio information through the display 320. The biometric sensor may, for example, be a fingerprint sensor 350a or 350b. The fingerprint sensor 350a or 350b may include a first fingerprint sensor 350a or a second fingerprint sensor 350b.

According to an embodiment of the present disclosure, the fingerprint sensor 350a or 350b may be implemented in a capacitive form where sensing electrodes are disposed on the surface of the display 320. As another example, the fingerprint sensor 350a or 350b may be implemented in an ultrasound wave form where an ultrasound wave transmitter/receiver is formed adjacent to the layer where the fingerprint sensor 350a or 350b is disposed.

According to an embodiment of the present disclosure, the electronic device 300 may dispose a first fingerprint sensor 350a at an upper part of the display 320. According to an embodiment of the present disclosure, the first fingerprint sensor 350a may be disposed between the transparent cover 303 and the display 320 and may sense the user's fingerprint in the active area A.

According to an embodiment of the present disclosure, the electronic device 300 may dispose a second fingerprint sensor 350b at a lower part of the display 320. According to an embodiment of the present disclosure, the second fingerprint sensor 350b may be configured as an optical fingerprint sensor for sensing the user's fingerprint using a light emission from the display 320 as a light source. The light emission may be implemented through light emitted from a red (R), green (G), or blue (B) pixel of the display 320 or a light source (e.g., an infrared (IR) light emitting diode (LED) separately provided inside the display 320. As another example, the electronic device 300 may further include a shock absorber 380 to protect the second fingerprint sensor 350b against damage due to an external impact. The shock absorber 380 may be disposed between the second fingerprint sensor 350b and the display 320. As another example, a plurality of shock absorbers 380 may be provided which are spaced apart at both sides of the second fingerprint sensor 350b. However, the arrangement and number of shock absorbers 380 are not limited thereto, and various numbers of shock absorbers 380 may be provided in various arrangements to protect the second fingerprint sensor 350b.

According to an embodiment of the present disclosure, a printed circuit part (e.g., including a printed circuit board) 360 may be disposed under the second fingerprint sensor 350b to be electrically connected with the second fingerprint sensor. As another example, the electronic device 300 may include no separate touch sensor (not shown) and may obtain the user's touch input by controlling the first fingerprint sensor 350a or the second fingerprint sensor 350b.

Figure 4:
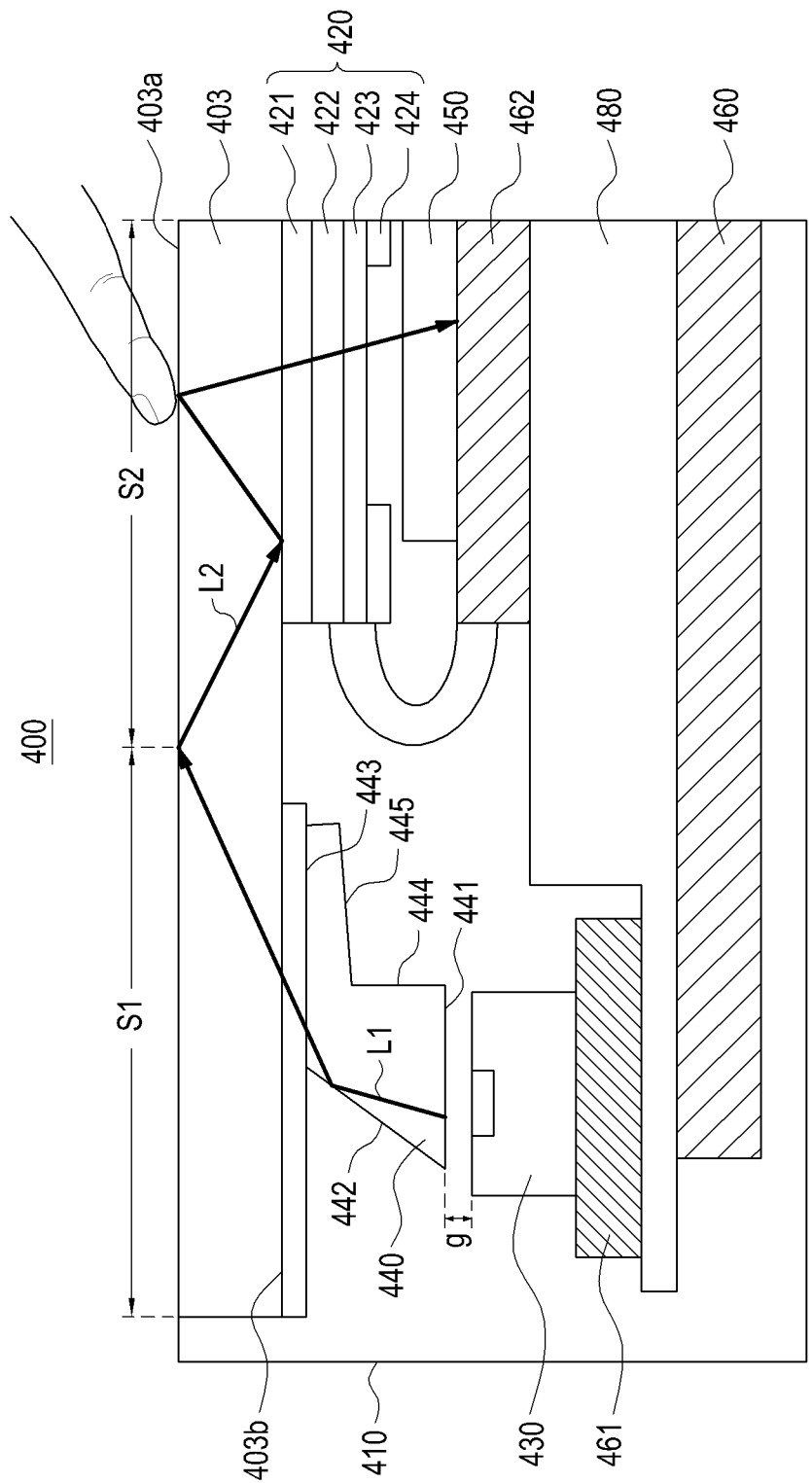
FIG. 4 is a cross-sectional view taken along line C-C' of FIG. 2A, according to an example embodiment of the present disclosure.

FIG. 4 is a cross-sectional view taken along line C-C' of FIG. 2A, according to an example embodiment of the present disclosure. Referring to FIG. 4, a housing 410, a transparent cover 403, and a display 420 of an electronic device 400 may correspond, for example, to the housing 210, the transparent cover 203, and the display 420, respectively, of FIG. 2.

Referring to FIG. 4, the electronic device 400 may include the housing 410, the display 420 exposed to the transparent cover 403, which forms an upper surface of the housing 410, an illumination part (e.g., including light emitting circuitry) 430 that is disposed inside the housing 410 to provide light, a coupler (e.g., comprising an optical coupler comprising a light transmitting/reflecting material) 440 that is disposed on a surface of the display 420 and reflects light from the illumination part 430 to the transparent cover 403, and a fingerprint sensor 450.

According to an embodiment of the present disclosure, the transparent cover 403 of the electronic device 400 may be positioned at a front surface of the housing 410 to protect the display 420 from the external environment. The display 420 may be connected with the fingerprint sensor 450 and/or touch sensor that is in the form of a panel integrated with the display 420 to be utilized not only as an output device but also as an input device.

According to an embodiment of the present disclosure, the housing 410 may include a supporting member (e.g., comprising a support) 480 that supports the illumination part 430, the fingerprint sensor 450, and/or the printed circuit part 460. The supporting member 480 may be comprised of a metal. The supporting member 480 may be disposed between the display 420 and a rear cover (the rear cover 240 of FIG. 2). For example, the supporting member 480 may be interposed between the display 420 and the printed circuit part 460. The supporting member 480 may prevent IC chips mounted on the printed circuit part 460 from contacting the display 420. The supporting member 480 may provide electromagnetic shielding, preventing electromagnetic interference between the IC chips. The supporting member 480 may reinforce hardness of the electronic device 400. For example, several openings or recesses may be formed in part of the housing 210 depending on the arrangement of the electronic parts inside the electronic device 400, deteriorating the hardness of the electronic device 400. The supporting member 480 may be mounted and engaged inside the electronic device 400, reinforcing the hardness of the electronic device 400. According to an embodiment of the present disclosure, the printed circuit part 460 may be disposed between the display 420 and the rear cover. The printed circuit part 460 may include at least one conducting path.

According to an embodiment of the present disclosure, the printed circuit part 460 may include at least one printed circuit board that extends in a direction to make an electrical connection with a part, such as the illumination part 430 and/or fingerprint sensor 450. According to an embodiment of the present disclosure, the illumination part 430 may be disposed on the a first printed circuit board 461 that extends from the printed circuit part 460, and the illumination part 430 may be electrically connected with the first printed circuit board 461. The fingerprint sensor 450 may be disposed on a second printed circuit board 462 that extends from the printed circuit part 460, and the fingerprint sensor 450 may be electrically connected with the second printed circuit board 462.

According to an embodiment of the present disclosure, the illumination part 430 for providing light may be disposed between the first printed circuit board 461 and the coupler 440 (the term "coupler" as used in the present disclosure may be interchangeably used with the term "optical coupler"), and the illumination part 430 may be electrically connected with the first printed circuit board 461 to emit light. The first printed circuit board 461 may be a flexible printed circuit board. The illumination part 430 may, for example, and without limitation be, e.g., an IR LED module including IR LED circuitry configured to emit light. The illumination part 430 may radiate light to a surface of the coupler 440.

According to an embodiment of the present disclosure, the coupler 440 may be disposed between the transparent cover 403 and the illumination part 430 to provide light, which is received from the illumination part 430, to the transparent cover 403. Light incident into the coupler 440 may form a first path L1 including a total (or substantially total) reflection. For example, the first path L1 of light coming from the illumination part 430 into the coupler 440 provides at least one total reflection by which the path of light coming from the illumination part 430 is changed from an upper direction to an upper and right direction.

According to an embodiment of the present disclosure, the coupler 440 may be formed in such a shape that surfaces of the coupler 440 have different lengths and different inter-surface angles or inclinations. The coupler 440 may be formed of a material with a high transmittance. For example, the coupler 440 may have a transmittance of about 90% or more. The coupler 440 may be formed of a material including silicon which is transparent.

According to an embodiment of the present disclosure, the coupler 440 may include a first surface 441 onto which light emitted from the illumination part 430 is incident, a second surface 442 forming a surface inclined with respect to the first surface 441, and a third surface 443 that is parallel with the first surface 441 and provides the light to the transparent cover 403. For example, a space of the coupler 440 which is surrounded by the first surface 441, the second surface 442, and the third surface 443, may form a first path L1 of light. As another example, the first surface 441 may be disposed to face an upper surface of the illumination part 430 and to have a different length than the upper surface of the illumination part 430. As another example, the first surface 441 of the coupler 440 may be spaced apart at a predetermined gap g from the upper surface of the illumination part 430. The predetermined gap g may be an air gap and may have a different refractive index from the inside of the coupler 440.

According to an embodiment of the present disclosure, the second surface 442 may be a surface inclined at a predetermined angle with respect to the first surface 441. For example, the angle between the first surface 441 and the second surface 442 may be an acute angle. As another example, the second surface 442 may totally reflect light delivered from the first surface 441 to the third surface 443.

According to an embodiment of the present disclosure, the third surface 443 may transmit the light from the second surface 442 to the transparent cover 403. The third surface 443 may be parallel with the first surface 441 while facing the first surface 441, and the third surface 443 may have a different length from the first surface 441. As another example, the third surface 443 may be disposed to face a lower surface 403b of the transparent cover 403. The third surface 443 may be attached by an adhesive to the lower surface 403b of the transparent cover 403.

According to an embodiment of the present disclosure, the coupler 440 may include a fourth surface 444 and a fifth surface 445 in addition to the first surface 441, the second surface 442, and the third surface 443 that are arranged on the first path L1 of light. The fourth surface 444 and the fifth surface 445 may support the coupler 440 and connect the first surface 441 and the third surface 443 together. According to an embodiment of the present disclosure, although the coupler 440 provides the space for the first path L1 of light in one form through the fourth surface 444 and the fifth surface 445, embodiments of the present disclosure are not limited thereto. Any other various forms may also be possible depending on the internal structure of the electronic device 400. For example, such implementation may be made with one surface.

According to an embodiment of the present disclosure, the transparent cover 403 may reflect light from the coupler 440 to the upper surface 403a and/or lower surface 403b of the transparent cover 403, forming a second path L2 of light inside the transparent cover 403. Light which travels along the second path L2 of light may be delivered to the fingerprint sensor 450 which is disposed under the active area (active area A of FIG. 2) of the transparent cover 403.

According to an embodiment of the present disclosure, light delivered along the upper surface 403a and the lower surface 403b of the transparent cover 403 may be directed towards the fingerprint of the user which contacts the active area A of the transparent cover 403. The light is reflected by the ridges and/or valleys of the fingerprint, reaching the fingerprint sensor 450. For example, the user's fingerprint disposed on the active area (the active area A of FIG. 2) of the transparent cover 403 has a valley-and-ridge surface which is divided into an area contacting the transparent cover 403 and an area not contacting the transparent cover 403. Light delivered along the second path L2 of light is totally reflected to propagate at the area contacting the transparent cover 403 but is partially absorbed into the user's fingerprint and partially scattered and reflected at the area not contacting the transparent cover 403. Accordingly, light incident onto the transparent cover 403 that does not contact the user's fingerprint is totally reflected and propagates towards the fingerprint sensor 450. However, light incident onto the transparent cover 403 contacting the user's fingerprint is absorbed, refracted, or scattered, failing to propagate towards the fingerprint sensor 450.

According to an embodiment of the present disclosure, the fingerprint sensor 450 is disposed under the transparent cover 403, and the fingerprint sensor 450 receives light from the transparent cover 403 to sense the user's fingerprint information. The fingerprint sensor 450 may be disposed on the second printed circuit board 462 and may be electrically connected with the second printed circuit board 462. According to an embodiment of the present disclosure, the overall area of the fingerprint sensor 450 may overlap the display 420 when viewed from above the transparent cover 403. As another example, the substantially overall area of the fingerprint sensor 450 may overlap the touch sensor and/or pressure sensor (not shown). The fingerprint sensor 450 may include at least one fingerprint electrode and a supporting plate (not shown). The supporting plate may be a polymer film formed of, e.g., polyethylene terephthalate (PET), or a glass substrate.

According to an embodiment of the present disclosure, the fingerprint sensor 450 focuses light beams totally reflected on the transparent cover 403. For example, the fingerprint sensor 450 may use a short-focal length lens for implementing a small-size optical scanning apparatus. As another example, the fingerprint sensor 450 may include a lens array corresponding to the size of an image to be scanned. The lens array may be formed in a matrix pattern.

According to an embodiment of the present disclosure, the display 420 disposed between the transparent cover 403 and the fingerprint sensor 450 may include a dielectric layer 421 and an optical layer 422. The dielectric layer 421 may be disposed in contact with the transparent cover 403. The dielectric layer 421 may include, for example, and without limitation, silicon, air, a foam, a membrane, an optical clear adhesive (OCA), sponge, rubber, ink, or a polymer (e.g., polycarbonate (PC) or PET). The optical layer 422 may be disposed under the dielectric layer 421.

According to an embodiment of the present disclosure, the optical layer 422 may be a layer to transmit a screen output from the display panel 423. At least one optical layer 422 may be layered on the display panel 423. For example, the optical layer 422 may include an optical compensation film to calibrate, for example, the phase difference of the screen output from the display panel 423. As another example, when the display 420 has touchscreen functionality, the optical layer 422 may be an indium-tin-oxide (ITO) film to sense, for example, the position of the user's contact.

According to an embodiment of the present disclosure, the optical layer 422 may include an optical compensation film, for example, a polarizing film. The optical compensation film may include, for example, and without limitation, a polyvinyl alcohol (PVA) film and tri-acetyl cellulose (TAC) films each attached onto both surfaces, respectively, of the PVA film, wherein the outer surface-side TAC film may be protected by a surface coat layer.

According to an embodiment of the present disclosure, a film layer 424 may be disposed between the transparent cover 403 and the second printed circuit board 462 to suppress light from scattering. The film layer 424 may control light to be directed towards the transparent cover 403, suppressing the scattering of light that is emitted to the outside (e.g., in the direction towards the rear surface of the electronic device 400). However, the film layer 424 may have an opening at a portion thereof, to provide light from the transparent cover 403 to the fingerprint sensor 450. For example, the film layer 424 may have an opening in an area corresponding to the fingerprint sensor 450, providing a space that allows light reflected on an area of the transparent cover 403 to reach the fingerprint sensor 450.

According to an embodiment of the present disclosure, the coupler 440 and the illumination part 430 may be positioned under a first area S1 of the transparent cover 403, and the fingerprint sensor 450 may be positioned under a second area S2 of the transparent cover 403. The first area S1 and the second area S2 may be positioned adjacent to each other. The transparent cover 403 may form a second path L2 of light which is generated from the illumination part 430 in the first area S1 and the second area S2. According to an embodiment of the present disclosure, the second path L2 of light may be provided by repeated total reflection between the upper surface and lower surface of the transparent cover 403.

Figure 5A:
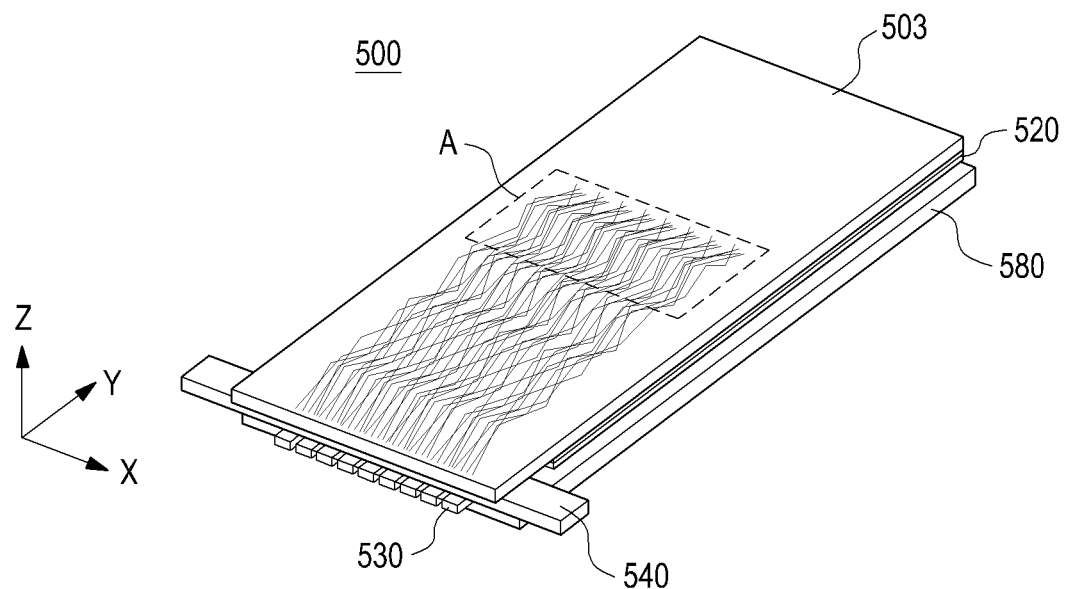
FIG. 5A is a perspective view illustrating example light paths in a portion of an electronic device as viewed from the top according to an example embodiment of the present disclosure.
Figure 5B:
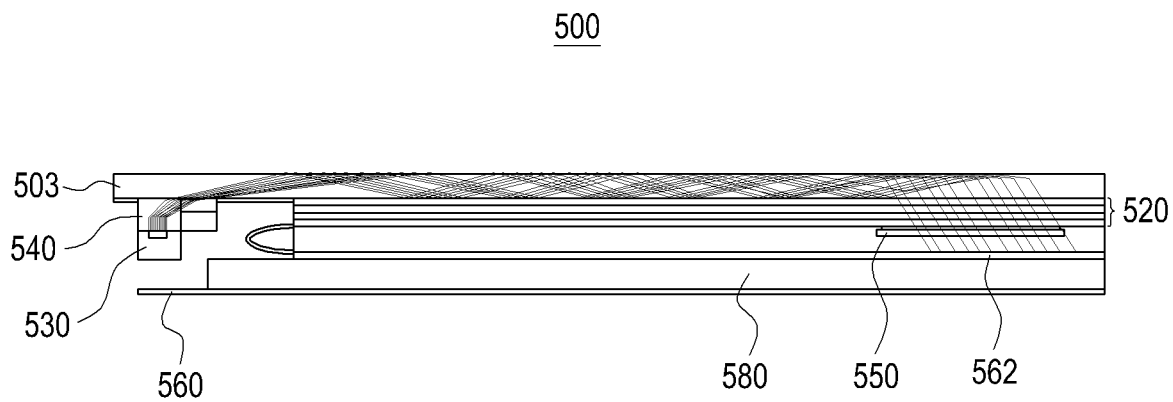
FIG. 5B is a cross-sectional view illustrating example light paths in a portion of an electronic device according to an example embodiment of the present disclosure.

FIG. 5A is a perspective view illustrating light paths of light emitted from an illumination part 530 of an electronic device 500 according to an example embodiment of the present disclosure. FIG. 5A is a perspective view illustrating light paths in a portion of an electronic device 500 as viewed from the top. FIG. 5B is a cross-sectional view illustrating light paths in a portion of an electronic device 500 according to an example embodiment of the present disclosure. Referring to FIGS. 5A and 5B, a transparent cover 503, a display 520, supporting member 580, printed circuit board 562 and a printed circuit part 560 of an electronic device 500 may correspond, for example, to the transparent cover 403, the display 420, supporting member 480, second printed circuit board 462 and the printed circuit part 460, respectively, of FIG. 4.

Referring to FIGS. 5A and 5B, the electronic device 500 may include a transparent cover 503 formed, for example, of glass, a coupler (e.g., an optical coupler) 540 disposed under the transparent cover 503, the display 520, an illumination part (e.g., including light emitting circuitry) 530, and the printed circuit part (e.g., including a printed circuit board) 560. According to an embodiment of the present disclosure, a plurality of illumination parts 530 may be formed along the X axis at a lower end of a portion of the transparent cover 503. The plurality of illumination parts 530 may be arranged in a single row. For example, the illumination part 530 may, for example, and without limitation, be an IR LED. For example, nine illumination parts 530 may be arranged in a row. The plurality of illumination parts 530 may be arranged to radiate multiple light beams in a lower-to-upper direction towards the coupler 540. However, the number and/or type of the illumination parts 530 is not limited thereto. Various numbers of illumination parts 530 may be located in various positions for effective light delivery and reflection.

According to an embodiment of the present disclosure, the coupler 540 may be designed in a size corresponding to the length of the array of the multiple illumination parts 530 to receive light beams from the plurality of illumination parts 530. Light beams incident onto the coupler 540 may be totally reflected on the inclined surface of the coupler 540 to the transparent cover 503. The coupler 540 may minimize and/or reduce the angle of reflection so that the light beams from the illumination parts 530 may be reflected to a particular area of the transparent cover 503. The minimized and/or reduced angle of reflection leads to an increase in the efficiency of light totally reflected to the transparent cover 503.

Figure 6:
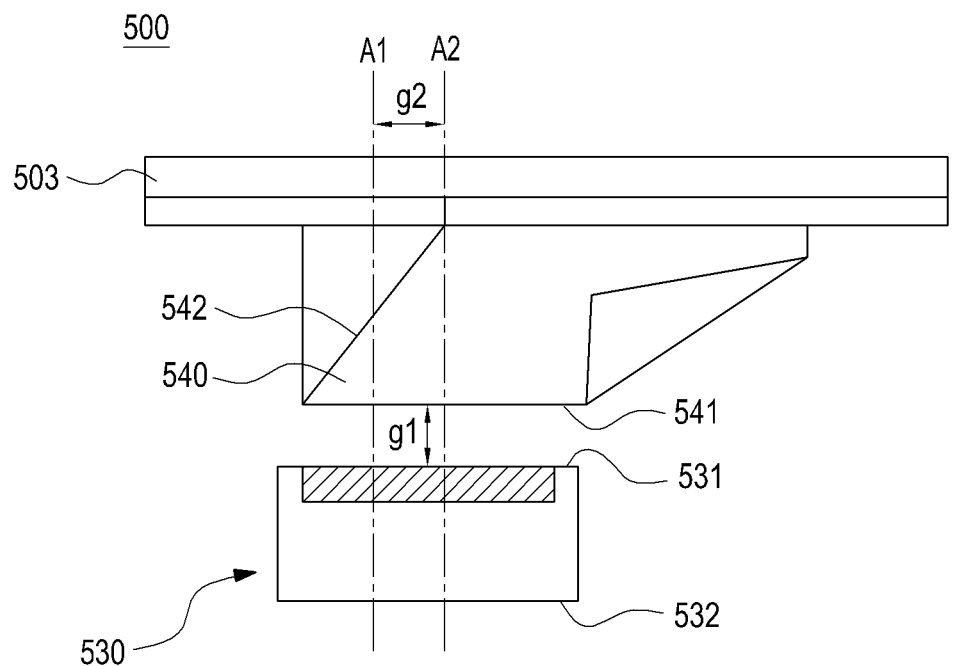
FIG. 6 is a cross-sectional view illustrating an example arrangement of an illumination part and a coupler according to an example embodiment of the present disclosure.

FIG. 6 is a cross-sectional view illustrating an example arrangement of an illumination part 530 and a coupler 540 according to an example embodiment of the present disclosure. The transparent cover 503, the illumination part 530, and the coupler 540 of the electronic device illustrated in FIG. 6 may correspond, for example, to the transparent cover 403, the illumination part 430, and the coupler 440, respectively, of FIG. 4.

Referring to FIG. 6, the coupler 540 may be positioned opposite the illumination part 530 under the transparent cover 503. According to an embodiment of the present disclosure, the coupler 540 may include a first surface 541 facing an upper surface of the illumination part 530 and a second surface 542 to totally reflect light from the illumination part 530. The second surface 542 may be a surface inclined at an acute angle with respect to the first surface 541.

In designing the electronic device according to an embodiment of the present disclosure, various distances may be implemented between the illumination part 530 and the coupler 540 for better light effects. The illumination part 530 and the coupler 540 may be designed to be spaced apart at a predetermined gap g1. The predetermined gap g1 may be filled with a material with a particular transmittance and refractive index. For example, the material may include a material having a transmittance of about 90% or more and a refractive index of about 1.5.

According to an embodiment of the present disclosure, a first virtual line A1 including the center of the second surface 542 of the coupler 540 and a second virtual line A2 including the center of the upper surface 531 and the lower surface 532 of the illumination part 530 may be designed in parallel with each other while being spaced apart at a predetermined angle from each other. For example, the first virtual line A1 of the coupler 540 may include the second surface 542, and the first virtual line A2 may be a line perpendicular to the first surface 541. The second virtual line A2 of the illumination part 530 may include the center of the light and may be a line perpendicular to the upper surface 531 and/or the lower surface 532 of the illumination part 530. The first virtual line A1 and the second virtual line A2 may be controlled to present a predetermined angle g2, rather than being arranged along the same line, thereby leading to better optical efficiency depending on assembly tolerances.

Figure 7A:
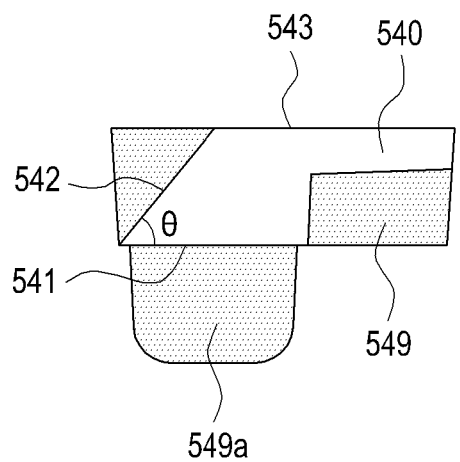
FIG. 7A is a cross-sectional view illustrating an example of a coupler according to an example embodiment of the present disclosure.
Figure 7B:
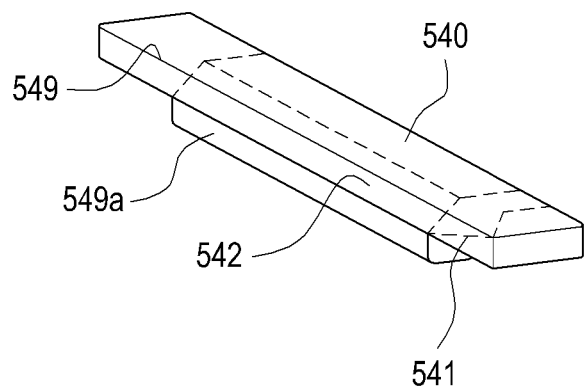
FIG. 7B is a perspective view illustrating an example of a coupler according to an example embodiment of the present disclosure.

FIG. 7A is a cross-sectional view illustrating an example of a coupler 540 according to an example embodiment of the present disclosure. FIG. 7B is a perspective view illustrating an example of a coupler 540 according to an example embodiment of the present disclosure. The coupler 540 of the electronic device illustrated in FIGS. 7A and 7B may correspond, for example, to the coupler 440 of FIG. 4.

Referring to FIGS. 7A and 7B, the coupler 540 may be configured to, at least partially, have an inclined surface to reflect light from a light source (e.g., an illumination part) at a predetermined angle. A cover member 549 may be provided to surround at least one surface of the coupler 540, protecting the coupler 540.

According to an embodiment of the present disclosure, the coupler 540 may include a first surface 541 onto which light emitted from the illumination part 430 of FIG. 4 is incident, a second surface 542 forming a surface inclined with respect to the first surface 541, and a third surface 543 that is parallel with the first surface 541 and provides the light to the transparent cover. For example, the first surface 541 may be a lower surface of the coupler 540, and the third surface 543 may be an upper surface of the coupler 540. For example, the centers of the first surface 541 and the second surface 543 may not be aligned with the same line, and the first surface 541 and the third surface 543 may be provided with different lengths. The second surface 542 may be disposed between the first surface 541 and the third surface 543. The second surface 542 may be an inclined surface where light is totally reflected. For example, the second surface 542 may form an acute angle with respect to the first surface 541, and the second surface 542 may form an obtuse angle with respect to the third surface 543.

According to an embodiment of the present disclosure, the third surface 543 of the coupler 540 may project beyond the first surface 541. Other additional surfaces may be formed to connect the projecting third surface 543 with the first surface 541. The third surface 543 may be designed to correspond to the area where a light reflection reaches, forming a light path along which light totally reflected on the second surface 542 is mostly incident onto the transparent cover 403 illustrated in FIG. 4.

According to an embodiment of the present disclosure, the cover member 549 may be formed to surround the first surface 541 and the second surface 542 of the coupler 540, protecting the surfaces. The cover member 549 may be shaped as a rectangular block with a lower portion of the rectangular block protruded. For example, a protrusion 549*a* is formed on the lower surface of the cover member 549, forming a gap between the light source and the coupler 540 and allowing light from the light source to be refracted before reaching the first surface 541. As another example, the protrusion 549*a* may be positioned to contact the illumination part 430 of FIG. 4. Accordingly, the refractive index of light from the illumination part may be adjusted.

However, the cover member 549 is not limited to the shape and may rather be formed in various shapes to protect each surface (e.g., the first surface 541 and the second surface 542) of the coupler 540.

Figure 8A:
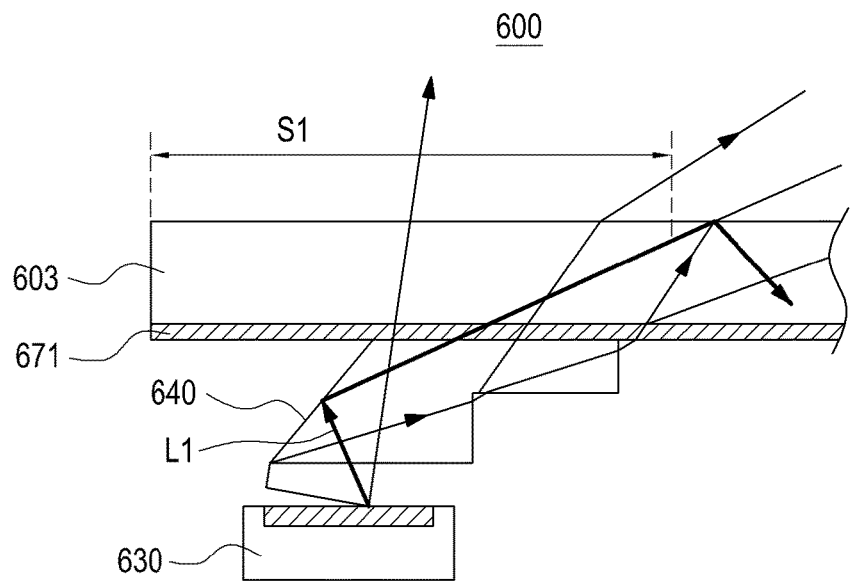
FIGS. 8A and 8B are cross-sectional views illustrating an example arrangement of a dielectric layer between a transparent cover and a coupler and a dielectric layer between the transparent cover and a fingerprint sensor in an electronic device according to an example embodiment of the present disclosure.
Figure 8B:
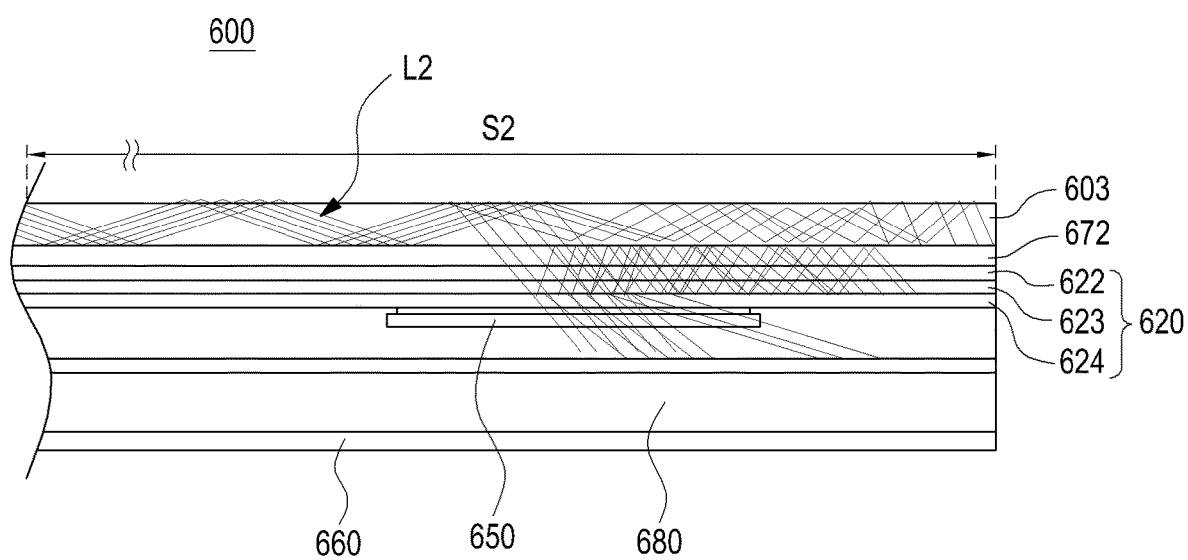

FIGS. 8A and 8B are cross-sectional views illustrating an example arrangement of a dielectric layer 671 between a transparent cover 603 and a coupler 640 and a dielectric layer 672 between the transparent cover 603 and a fingerprint sensor 650 in an electronic device 600 according to an example embodiment of the present disclosure. FIG. 8A is a cross-sectional view illustrating a first dielectric layer 671 between the transparent cover 603 and the coupler 640. FIG. 8B is a cross-sectional view illustrating a second dielectric layer 672 between the transparent cover 603 and the fingerprint sensor 650. The transparent cover 603, coupler 640, and dielectric layer 670 of the electronic device 600 illustrated in FIG. 8 may correspond, for example, to the transparent cover 403, the coupler 440, and the dielectric layer 471, respectively, of FIG. 4.

Referring to FIG. 8A, the first dielectric layer 671 may be disposed between the transparent cover 603 and the coupler 640. The first dielectric layer 671 may be disposed in contact with a lower part of the transparent cover 603 to take up the overall area of a first area S1 of the transparent cover 603. The first dielectric layer 671 may have a different refractive index than the transparent cover 603. For example, the first dielectric layer 671 may include silicon, air, a foam, a membrane, an OCA, sponge, rubber, an ink, or a polymer (e.g., PC or PET). As another example, the first dielectric layer 671 may have a refractive index relatively larger than the transparent cover 603, e.g., about 1.5 to about 1.6.

According to an embodiment of the present disclosure, light emitted from the illumination part 630 may be incident via a first path L1 of light onto the first dielectric layer 671, and light whose path is varied depending on the refractive index of the first dielectric layer 671 may be delivered to the transparent cover 603.

Referring to FIG. 8B, the second dielectric layer 672 may be disposed between the transparent cover 603 and the fingerprint sensor 650. The second dielectric layer 672 may be disposed and attached to a lower part of the transparent cover 603 to take up the overall area of a second area S2 of the transparent cover 603. The second dielectric layer 672 may have a different refractive index than the transparent cover 603. For example, the second dielectric layer 672 may include, for example, and without limitation, silicon, air, a foam, a membrane, an OCA, sponge, rubber, an ink, or a polymer (e.g., PC or PET). As another example, the second dielectric layer 672 may have a refractive index relatively smaller than the transparent cover 603, e.g., about 1.4 to about 1.5.

According to an embodiment of the present disclosure, at least one second dielectric layer 672 may be layered. An optical layer 622, a display panel 623, and a film layer 624 may sequentially be layered under the second dielectric layer 672.

According to an embodiment of the present disclosure, light forming the second path L2 inside the transparent cover 603 may be delivered to the fingerprint sensor 650 along different paths depending on the refractive index of the second dielectric layer 672.

According to an embodiment of the present disclosure, the first dielectric layer 671 may be used as an adhesive for the transparent cover 603 and the coupler 640. The second dielectric layer 672 may be used as an adhesive for the transparent cover 603 and the optical layer 622. As another example, the first dielectric layer 671 and the second dielectric layer 672 may have different refractive indexes, and may be formed of materials with various refractive indexes allowing light to efficiently propagate inside the transparent cover 603 in the first area S1 and light from the transparent cover 603 to be sensed by the fingerprint sensor 650 in the second area S2.

Figure 9A:
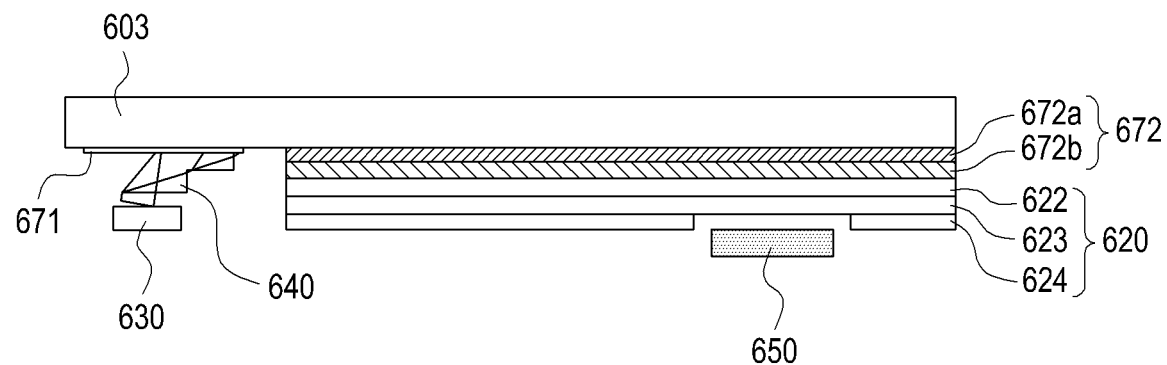
FIGS. 9A and 9B are cross-sectional views illustrating an example arrangement of a second dielectric layer between a transparent cover and a fingerprint sensor according to an example embodiment of the present disclosure.
Figure 9B:
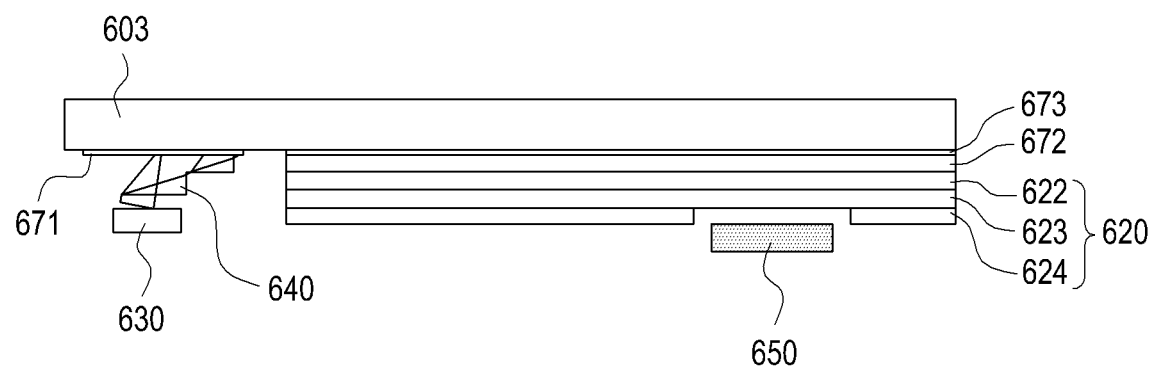

FIGS. 9A and 9B are cross-sectional views illustrating an arrangement of a second dielectric layer 672 between a transparent cover 603 and a fingerprint sensor 650 according to an example embodiment of the present disclosure. The transparent cover 603, coupler 640, and second dielectric layer 672 of the electronic device 600 illustrated in FIGS. 9A and 9B may correspond, for example, to the transparent cover 603, the coupler 640, and the second dielectric layer 672, respectively, of FIGS. 8A and 8B.

Referring to FIGS. 9A and 9B, as set forth above, the electronic device 600 may include a first dielectric layer 671 for attaching the transparent cover 603 with the coupler 640 and a second dielectric layer 672 for attaching the transparent cover 603 with the display 620.

According to an embodiment of the present disclosure, the second dielectric layer 672 may include a plurality of sub layers that are arranged to have different refractive indexes, controlling the reflection and/or refraction of light from the transparent cover 603.

Referring to FIG. 9A, the second dielectric layer 672, an optical layer 622, a display panel 623, a film layer 624, and a fingerprint sensor 650 may sequentially be arranged from the transparent cover 603. The second dielectric layer 672 may include two sub layers. The film layer 624 may have an opening in an area corresponding to the fingerprint sensor 650, providing a space that allows light reflected on an area of the transparent cover 603 to reach the fingerprint sensor 650.

According to an embodiment of the present disclosure, the second dielectric layer 672 may include two adhesive layers 672*a* and 672*b* facing each other between the transparent cover 603 and the display panel 623. For example, the second dielectric layer 672 may include a first adhesive layer 672*a* disposed in contact with the transparent cover 603 and a second adhesive layer 672*b* disposed in contact between the first adhesive layer 672*a* and the optical layer 622.

According to an embodiment of the present disclosure, the first adhesive layer 672*a* and the second adhesive layer 672*b* may be formed of a combination of adhesives with different refractive indexes. The first adhesive layer 672*a* and the second adhesive layer 672*b* may have a refractive index smaller than the transparent cover 603. As another example, the first adhesive layer 672*a* may have a refractive index smaller than the second adhesive layer 672*b*. For example, the first adhesive layer 672*a* may have a refractive index of about 1.4 to about 1.45, and the second adhesive layer 672*b* may have a refractive index of about 1.47 to about 1.5.

Referring to FIG. 9B, a coat layer 673, the second dielectric layer 672, an optical layer 622, a display panel 623, a film layer 624, and a fingerprint sensor 650 may sequentially be arranged from the transparent cover 603. The coat layer 673 may further be provided on the second dielectric layer 672. The film layer 624 may have an opening in an area corresponding to the fingerprint sensor 650, providing a space that allows light reflected on an area of the transparent cover to reach the fingerprint sensor 650.

According to an embodiment of the present disclosure, the coat layer 673 and the second dielectric layer 672 may be arranged to face each other between the transparent cover 603 and the display panel 623. For example, there may be provided the coat layer 673 disposed in contact with the transparent cover 603 and the second dielectric layer 672 disposed in contact between the coat layer 673 and the optical layer 622.

According to an embodiment of the present disclosure, the coat layer 673 and the second dielectric layer 672 may be formed of a combination of adhesives with different refractive indexes. The coat layer 673 and the second dielectric layer 672 may have a refractive index smaller than the transparent cover 603. As another example, the coat layer 673 may have a refractive index smaller than the second dielectric layer 672. For example, the coat layer 673 may have a refractive index of about 1.4 to about 1.45, and the second dielectric layer 672 may have a refractive index of about 1.47 to about 1.5.

According to an embodiment of the present disclosure, light from the transparent cover 603 may be totally reflected depending on a large-or-small relationship in refractive index between the transparent cover 603, the coat layer 673, and the second dielectric layer 672.

Figure 10:
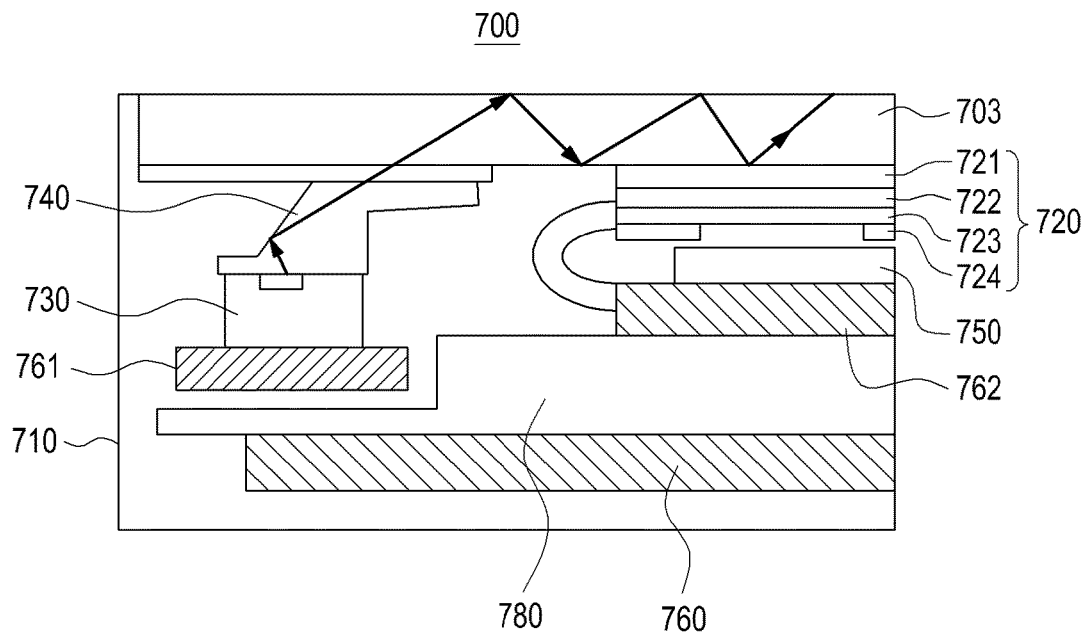
FIG. 10 is a cross-sectional view illustrating an example structure of an illumination part of an electronic device and a coupler according to an example embodiment of the present disclosure.

FIG. 10 is a cross-sectional view illustrating an example structure of an example illumination part 730 and a coupler 740 of an electronic device 700 according to an embodiment of the present disclosure. The transparent cover 703, display 720 (dielectric layer 721, optical layer 722, display panel 723, film layer 724), illumination part 730, coupler 740, and fingerprint sensor 750 of the electronic device 700 illustrated in FIG. 10 may correspond, for example, to the transparent cover 403, display 420 (dielectric layer 421, optical layer 422, display panel 423, film layer 424), the illumination part 430, the coupler 440, and the fingerprint sensor 750, respectively, of FIG. 4.

Referring to FIG. 10, the electronic device 700 may include the housing 710, the display 720 exposed to the transparent cover 703, which forms an upper surface of the housing 710, an illumination part 730 that is disposed inside the housing 710 to provide light, a coupler 740 that is disposed on a surface of the display 720 and reflects light from the illumination part 730 to the transparent cover 703, and a fingerprint sensor 750.

According to an embodiment of the present disclosure, the transparent cover 703 of the electronic device 700 may be positioned at a front surface of the housing 710 to protect the display 720 from the external environment. According to an embodiment of the present disclosure, the housing 710 may include a supporting member 780 that supports the illumination part 730, the fingerprint sensor 750, and/or the printed circuit part 760. The supporting member 780 may be formed of a metal. The supporting member 480 may be disposed between the display 720 and a rear cover (the rear cover 240 of FIG. 2).

According to an embodiment of the present disclosure, the printed circuit part 760 may include at least one printed circuit board that extends in a direction to make an electrical connection with a part, such as the illumination part 730 or fingerprint sensor 750. According to an embodiment of the present disclosure, the illumination part 730 may be disposed on the a first printed circuit board 761 that extends from the printed circuit part 760, and the illumination part 730 may be electrically connected with the first printed circuit board 761. The fingerprint sensor 750 may be disposed on a second printed circuit board 762 that extends from the printed circuit part 760, and the fingerprint sensor 750 may be electrically connected with the second printed circuit board 762.

According to an embodiment of the present disclosure, the illumination part 730 for providing light may be disposed between the first printed circuit board 761 and the coupler 740, and the illumination part 730 may be electrically connected with the first printed circuit board 761 to emit light. The first printed circuit board 761 may be a flexible printed circuit board. The illumination part 730 may be, for example, an IR LED module. The illumination part 730 may radiate light to a surface of the coupler 740.

According to an embodiment of the present disclosure, the coupler 740 may be disposed between the transparent cover 703 and the illumination part 730 to provide light, which is received from the illumination part 730, to the transparent cover 703. Light incident into the coupler 740 may form a path including a total reflection. For example, the light path of the coupler 740 on which light is incident from the illumination part 730 may produce adhesive layer one total reflection.

According to an embodiment of the present disclosure, the illumination part 730 and the coupler 740 may come in contact with each other with no gap therebetween. As another example, a lower surface of the coupler 740 may be formed to be long enough to cover an upper surface of the illumination part 730 so as to receive a light emission from the illumination part 730. As another example, the electronic device 700 may include a shock absorber (e.g., sponge or Poron™) that may be disposed between the illumination part 730 and the coupler 740 to prevent damage.

The description of FIG. 4 may apply to the specific configuration of FIG. 10. Thus, no further detailed description of the configuration of FIG. 10 is given below.

Figure 11:
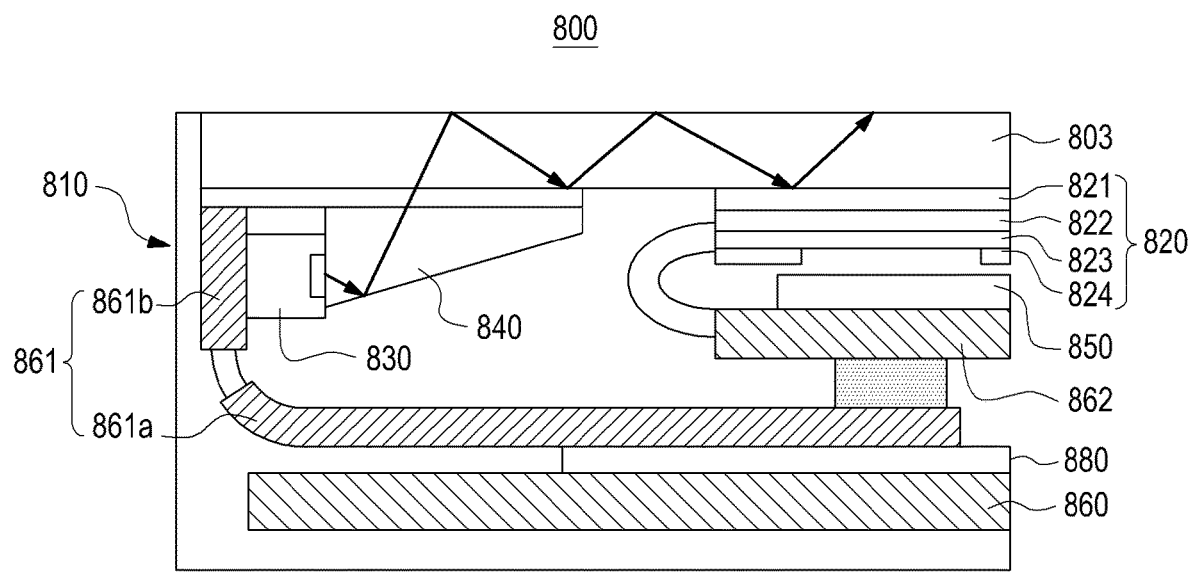
FIG. 11 is a cross-sectional view illustrating an example structure of an illumination part of an electronic device and a coupler according to an example embodiment of the present disclosure.

FIG. 11 is a cross-sectional view illustrating an example structure of an example illumination part 830 and a coupler 840 of an electronic device 800 according to an example embodiment of the present disclosure. The transparent cover 803, display 820 (dielectric layer 821, optical layer 822, display panel 823, film layer 824), illumination part 830, coupler 840, and fingerprint sensor 850 of the electronic device 800 illustrated in FIG. 11 may correspond, for example, to the transparent cover 403, display 420 (dielectric layer 421, optical layer 422, display panel 423, film layer 424), the illumination part 430, the coupler 440, and the fingerprint sensor 850, respectively, of FIG. 4.

Referring to FIG. 11, the electronic device 800 may include the housing 810, the display 820 exposed to the transparent cover 803, which forms an upper surface of the housing 810, an illumination part 830 that is disposed inside the housing 810 to provide light, a coupler 840 that is disposed on a surface of the display 820 and reflects light from the illumination part 830 to the transparent cover 803, and a fingerprint sensor 850.

According to an embodiment of the present disclosure, the transparent cover 803 of the electronic device 800 may be positioned at a front surface of the housing 810 to protect the display 820 from the external environment. According to an embodiment of the present disclosure, the housing 810 may include a supporting member 880 that supports the illumination part 830, the fingerprint sensor 850, and/or the printed circuit part 860.

According to an embodiment of the present disclosure, the printed circuit part 860 may include at least one printed circuit board that extends in a direction to make an electrical connection with a part, such as the illumination part 830 or fingerprint sensor 850. According to an embodiment of the present disclosure, the illumination part 830 may be disposed on the a first printed circuit board 861 that extends from the printed circuit part 860, and the illumination part 830 may be electrically connected with the first printed circuit board 861. The fingerprint sensor 850 may be disposed on a second printed circuit board 862 that extends from the printed circuit part 860, and the fingerprint sensor 850 may be electrically connected with the second printed circuit board 862.

According to an embodiment of the present disclosure, the first printed circuit board 861 may be extended to be disposed on a surface of a side portion of the housing 810, making an electrically connection with the illumination part 830 disposed at the side surface of the housing 810. For example, the first printed circuit board 861 may include a main part 861*a* disposed over the supporting member 880 and a sub part 861*b* extending from the main part 861*a* in parallel with the Z direction of the housing 810. The main part 861*a* and the sub part 861*b* of the first printed circuit board 861 may be flexible printed circuit boards.

According to an embodiment of the present disclosure, the illumination part 830 for providing light may be disposed between the first printed circuit board 861 and the coupler 840, and the illumination part 830 may be electrically connected with the sub part 861*b* of the first printed circuit board 861 to emit light. The illumination part 830 may be designed so that the lower surface of the illumination part 830 is positioned opposite the sub part 861*b* of the first printed circuit board 861 so as to emit light in the Y direction. The illumination part 830 may be, for example, an IR LED module. The illumination part 830 may radiate light to a surface of the coupler 840.

According to an embodiment of the present disclosure, the coupler 840 may be disposed so that different surfaces thereof face the transparent cover 803 and the illumination part 830 to provide light, which is received from the illumination part 830, to the transparent cover 803. The coupler 840 may include an inclined surface having total reflection to allow light received in the Y direction from the illumination part 830 to be directed towards the transparent cover 803. For example, the lower surface of the coupler 840 may be shaped as a trapezoid that contacts the illumination part 830. Light coming from the illumination part 830 may be totally reflected, at least once, on the inclined surface of the trapezoid.

According to an embodiment of the present disclosure, the illumination part 830 and the coupler 840 may come in contact with each other with no gap therebetween. As another example, the electronic device 800 may include a shock absorber (e.g., sponge or Poron™) that may be disposed between the illumination part 830 and the coupler 840 to prevent damage.

The description of FIG. 4 may apply to the specific configuration of the other components of FIG. 11. Thus, no further detailed description of the configuration of FIG. 11 is given below.

According to an example embodiment of the present disclosure, an electronic device may comprise a housing including a first surface facing in a first direction and a second surface facing in a second direction opposite the first direction, the housing including a transparent cover that comprises at least part of the first surface, a display disposed between the first surface and the second surface of the housing and configured to display information through the transparent cover to an outside, an illumination part comprising light emitting circuitry disposed at an inner side of an end of the first surface of the housing and configured to emit light to the transparent cover, an optical coupler disposed between the illumination part and the transparent cover and configured to reflect the light from the illumination part to the transparent cover, and a biometric sensor disposed under the transparent cover and the display.

According to an example embodiment of the present disclosure, the biometric sensor may substantially overlap the display when viewed from above the transparent cover.

According to an example embodiment of the present disclosure, the optical coupler may be disposed under a first area of the transparent cover, and the biometric sensor may be disposed under a second area of the transparent cover different from the first area.

According to an example embodiment of the present disclosure, the optical coupler is configured to provide a first path for guiding the light from the illumination part to be totally reflected inside the optical coupler to the transparent cover, and the transparent cover is configured to form a second path for guiding the light from the optical coupler to be reflected multiple times inside the transparent cover to the biometric sensor.

According to an example embodiment of the present disclosure, the light, after passing through the transparent cover along the second path, may be reflected from a user's fingerprint to reach the biometric sensor. The biometric sensor may be configured to sense the user's fingerprint that contacts the second area of the transparent cover.

According to an example embodiment of the present disclosure, the optical coupler may include a first surface where the light from the illumination part is incident and a second surface inclined with respect to the first surface and configured to totally reflect the light passing through the first surface.

According to an example embodiment of the present disclosure, the optical coupler may include a third surface disposed in parallel with the first surface and configured to allow the light reflected on the second surface to be incident onto the transparent cover.

According to an example embodiment of the present disclosure, at least part of the first surface and the second surface of the optical coupler may form an overlapping area when viewed from above the transparent cover. The first surface may be shorter than the third surface.

According to an example embodiment of the present disclosure, a refractive index of the optical coupler may be relatively larger than a refractive index of the transparent cover.

According to an example embodiment of the present disclosure, an electronic device may comprise a housing including a transparent cover exposed to an outside, a printed circuit part comprising a printed circuit board disposed inside the housing, an optical coupler disposed between the transparent cover and the printed circuit part and configured to deliver light from an illumination part comprising light emitting circuitry electrically connected with the printed circuit part to the transparent cover, and a biometric sensor disposed between the transparent cover and the printed circuit part and electrically connected with at least part of the printed circuit part configured to sense the light delivered through the transparent cover.

According to an example embodiment of the present disclosure, the electronic device may further comprise a cover member configured to protect the optical coupler. The cover member may include a protrusion that protects at least one surface of the coupler, be directed towards the printed circuit part, and face the illumination part.

According to an example embodiment of the present disclosure, the optical coupler may include a first surface on which the light from the illumination part is configured to be incident, a second surface inclined with respect to the first surface and configured to totally reflect the light passing through the first surface, and a third surface disposed in parallel with the first surface and configured to allow the light reflected on the second surface to be incident onto the transparent cover.

According to an example embodiment of the present disclosure, the transparent cover may be configured to totally reflect the light delivered from the third surface to an upper surface or a lower surface of the transparent cover to form a light path inside the transparent cover.

According to an example embodiment of the present disclosure, the electronic device may further comprise a first dielectric layer disposed between the transparent cover and the coupler and having a refractive index between a refractive index of the coupler and a refractive index of the transparent cover.

According to an example embodiment of the present disclosure, the electronic device may further comprise a second dielectric layer disposed between the transparent cover and the display and having a refractive index different from the refractive index of the first dielectric layer.

According to an example embodiment of the present disclosure, the second dielectric layer may include a plurality of different layers each of which has a different refractive index or a different transmittance with respect to the light.

According to an example embodiment of the present disclosure, the illumination part and the coupler may be spaced apart from each other with a gap layer interposed therebetween, and the gap layer may have a refractive index different from the illumination part and the coupler.

According to an example embodiment of the present disclosure, a film layer may be disposed between the transparent cover and the printed circuit part and configured to suppress the light from scattering, and the film layer may include an opening in an area corresponding to the biometric sensor to provide a space configured to allow light reflected in an area of the transparent cover to reach the biometric sensor.

According to an example embodiment of the present disclosure, the biometric sensor may comprise a transparent conductive material.

As is apparent from the foregoing description, according to an example embodiment of the present disclosure, an electronic device includes a biometric sensor that enables bio information to be obtained in a display activation area. Thus, such problems, such as identifying the user's bio information at a particular position other than in the display may be avoided, and the space limit on the electronic device may be addressed.

In an electronic device according to an example embodiment of the present disclosure, a light source is put to use in sensing the user's fingerprint information using a biometric sensor positioned in a display activation area, presenting better performance.

According to an example embodiment of the present disclosure, a biometric sensor-equipped electronic device adds no further physical switch, expanding the space and preventing the parts from being exposed externally—resultantly effective waterproofing.

It will be apparent to one of ordinary skill in the art that the electronic devices according to various example embodiments of the present disclosure as described above are not limited to the above-described example embodiments and those shown in the drawings, and various changes, modifications, or alterations may be made thereto without departing from the scope of the present disclosure.

What is claimed is:

1. An electronic device, comprising:
   a housing including a first surface facing in a first direction and a second surface facing in a second direction opposite the first direction, the housing including a transparent cover that comprises at least part of the first surface;
   a display disposed between the first surface of the housing and the second surface of the housing and configured to display information through the transparent cover to an outside;
   an illumination part comprising light emitting circuitry disposed at an inner side of an end of the first surface of the housing and configured to emit light to the transparent cover;
   an optical coupler disposed between the illumination part and the transparent cover configured to reflect light emitted from the illumination part to a biometric sensor via the transparent cover; and
   wherein the biometric sensor is disposed under the transparent cover and the display, wherein the biometric sensor and the display overlap each other when viewed from above the transparent cover, and wherein the optical coupler does not overlap the display when viewed from above the transparent cover.

2. The electronic device of claim 1, wherein the optical coupler is disposed under a first area of the transparent cover, and the biometric sensor is disposed under a second area of the transparent cover different from the first area.

3. The electronic device of claim 1, wherein the optical coupler is configured to form a first path for guiding light emitted from the illumination part to be totally reflected inside the coupler to the transparent cover, and the transparent cover is configured to form a second path for guiding the light received from the optical coupler to be reflected multiple times inside the transparent cover to the biometric sensor.

4. The electronic device of claim 3, wherein the light, after passing through the transparent cover along the second path, is configured to be reflected from a user's fingerprint to the biometric sensor, and wherein the biometric sensor is configured to sense the user's fingerprint that contacts the second area of the transparent cover.

5. The electronic device of claim 1, wherein the optical coupler includes a first surface on which light from the illumination part is configured to be incident and a second surface inclined with respect to the first surface and configured to totally reflect the light passing through the first surface.

6. The electronic device of claim 5, wherein the optical coupler includes a third surface disposed in parallel with the first surface and configured to allow the light reflected on the second surface to be incident on the transparent cover.

7. The electronic device of claim 6, wherein at least part of the first surface and the second surface of the optical coupler forms an overlapping area when viewed from above the transparent cover, and wherein the first surface has a length less than a length of the third surface.

8. The electronic device of claim 1, wherein a refractive index of the optical coupler is greater than a refractive index of the transparent cover.

9. An electronic device, comprising:
a housing including a transparent cover exposed to an outside;
a printed circuit part comprising a printed circuit board disposed inside the housing;
an optical coupler disposed between the transparent cover and the printed circuit part and configured to transmit light from an illumination part comprising light emitting circuitry electrically connected with the printed circuit part to a biometric sensor via the transparent cover; and
wherein the biometric sensor is disposed between the transparent cover and the printed circuit part and electrically connected with at least part of the printed circuit part and configured to sense light delivered through the transparent cover, wherein the biometric sensor and a display of the electronic device overlap each other when viewed from above the transparent cover, and wherein the optical coupler does not overlap the display when viewed from above the transparent cover.

10. The electronic device of claim 9, further comprising a cover member configured to protect the optical coupler, wherein the cover member includes a protrusion configured to protect at least one surface of the coupler, wherein the protrusion is directed towards the printed circuit part, and faces the illumination part.

11. The electronic device of claim 9, wherein the optical coupler includes a first surface configured to have light from the illumination part be incident, a second surface inclined with respect to the first surface and configured to totally reflect light passing through the first surface, and a third surface disposed in parallel with the first surface and configured to allow the light reflected on the second surface to be incident on the transparent cover.

12. The electronic device of claim 11, wherein the transparent cover is configured to totally reflect light received from the third surface to an upper surface and/or a lower surface of the transparent cover to form a light path inside the transparent cover.

13. The electronic device of claim 9, further comprising a first dielectric layer disposed between the transparent cover and the optical coupler and having a refractive index between a refractive index of the optical coupler and a refractive index of the transparent cover.

14. The electronic device of claim 13, further comprising a second dielectric layer disposed between the transparent cover and the display and having a refractive index different from the refractive index of the first dielectric layer.

15. The electronic device of claim 14, wherein the second dielectric layer includes a plurality of different layers, each of which has a different refractive index and/or a different transmittance with respect to the light.

16. The electronic device of claim 9, wherein the illumination part and the optical coupler are spaced apart from each other and have a gap layer interposed therebetween, wherein the gap layer has a refractive index different from the illumination part and the coupler.

17. The electronic device of claim 9, wherein a film layer is disposed between the transparent cover and the printed circuit part and configured to suppress light from scattering, wherein the film layer includes an opening in an area corresponding to the biometric sensor configured to provide a space allowing light reflected in an area of the transparent cover to reach the biometric sensor.

18. The electronic device of claim 9, wherein the biometric sensor comprises a transparent conductive material.

* * * * *